(12) United States Patent
Song et al.

(10) Patent No.: US 12,209,018 B2
(45) Date of Patent: Jan. 28, 2025

(54) SYSTEMS AND METHODS FOR PRODUCTION, STORAGE, AND TRANSPORTATION OF HYDROGEN

(71) Applicant: CHEVRON U.S.A. INC., San Ramon, CA (US)

(72) Inventors: Steven Xuqi Song, San Ramon, CA (US); Bi-Zeng Zhan, San Ramon, CA (US); Yaofan Yi, San Ramon, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 17/568,409

(22) Filed: Jan. 4, 2022

(65) Prior Publication Data
US 2023/0212004 A1    Jul. 6, 2023

(51) Int. Cl.
*C01B 3/00* (2006.01)
*B01J 23/745* (2006.01)

(52) U.S. Cl.
CPC ........... *C01B 3/0015* (2013.01); *B01J 23/745* (2013.01); *C01B 2203/1047* (2013.01); *C01B 2203/1252* (2013.01)

(58) Field of Classification Search
CPC . C01B 3/0015; C01B 3/30; C01B 2203/1047; C01B 2203/1252; B01J 23/745
See application file for complete search history.

(56) References Cited

U.S. PATENT DOCUMENTS 8,435,920 B2 * 5/2013 White .................... B01J 23/002
252/373

OTHER PUBLICATIONS

Gimeno et al. Ind. Eng. Chem. Res. 2010, 49, 996-1000 (Year: 2010).*
Rahimpour et al. Energy Fuels Apr. 27, 2013, 2351-2362 (Year: 2013).*
Modisha et al. Energy Fuels 2019, 33, 2778-2796 (Year: 2019).*
Luo et al. Renewable and Sustainable Energy Reviews, 2018, 81, 3186-3214 (Year: 2018).*
Bhavsar, Saurabh et al., Chemical Looping: To combustion and beyond, Catalysis Today 228 (2014) pp. 96-105.
International Search Report and Written Opinion dated Feb. 6, 2023 issue in PCT/US2022/45384.

(Continued)

*Primary Examiner* — Samir Shah
*Assistant Examiner* — Jordan W Taylor
(74) *Attorney, Agent, or Firm* — Hunton Andrews Kurth LLP

(57) ABSTRACT

The present disclosure refers to systems and methods for the production, storage, and transportation of hydrogen. In a representative embodiment a reactor system comprises a fluidized bed combustor configured for reduced metal oxide oxidation and heat generation without significant greenhouse gas emission and/or with readily capturable emissions. The reactor system also comprises a liquid organic hydrogen carrier dehydrogenation reactor. The fluidized bed combustor is operatively coupled to the liquid organic hydrogen carrier dehydrogenation reactor. Advantageously, at least a portion of heat generated by the fluidized bed combustor may be transferred to the liquid organic hydrogen carrier dehydrogenation reactor. In this manner hydrogen production and transportation is both energy efficient, low carbon intensity and cost-effective.

14 Claims, 2 Drawing Sheets

(56) References Cited

OTHER PUBLICATIONS

Coniku, Generation of hydrogen from biogas with inherent carbon dioxide sequestration via a hybrid chemical looping-steam iron process, Master of Science Thesis, Department of Energy and Environment, Chalmers University of Technology (2012), entire document.

Bulgarin et al., Purity of hydrogen released from the Liquid Organic Hydrogen Carrier compound perhydro dibenzyltoluene by catalytic dehydrogenation, International Journal of Hydrogen Energy, vol. 45, Issue 1, Jan. 2020, entire document.

Nurdiawati et al., Novel configuration of supercritical water gasification and chemical looping for highly-efficient hydrogen production from microalgae, Renewable and Sustainable Energy Reviews vol. 112, Sep. 2019, pp. 369-381.

Ismail et al., The performance of $Fe_2O_3$—CaO Oxygen Carriers and the Interaction of Iron Oxides with CaO during Chemical Looping Combustion and H2 production, Energy Procedia vol. 63, Oct. 2014, pp. 87-97.

Ryden et al., Continuous hydrogen production via the steam-iron reaction by chemical looping in a circulating fluidized-bed reactor, International Journal of Hydrogen Energy, vol. 37, Issue 6, Mar. 2012, pp. 4843-4854.

\* cited by examiner

Reducer: $4Fe_2O_3 + CH_4 \rightarrow 8FeO + CO_2 + 2H_2O$ $\Delta H_{reducer} > 0$ (endothermic)

Combustor: $4FeO + Air (O_2) \rightarrow 2Fe_2O_3$ $\Delta H_{combustor} < 0$ (exothermic)

SYSTEMS AND METHODS FOR PRODUCTION, STORAGE, AND TRANSPORTATION OF HYDROGEN

FIELD OF THE DISCLOSURE

The present disclosure relates to systems and methods for the production, storage, and/or transportation of hydrogen.

BACKGROUND AND SUMMARY

Hydrogen is one of the more important options for future clean energy. Unfortunately, storage and transportation of hydrogen fuel from its production location to, for example, a hydrogen gas station or other storage facility are often inefficient and/or costly today. This issue is well recognized as one key barrier for hydrogen to be deployed at a large scale. The storage of hydrogen in liquid organic hydrogen carriers (LOHC) systems has numerous advantages over conventional storage systems. Most importantly, hydrogen storage and transport in the form of LOHC system enables the use of the existing infrastructure for fuels. From a thermodynamic point of view, hydrogen storage in LOHC system requires an exothermic hydrogenation step and an endothermic dehydrogenation step.

The performance of a LOHC dehydrogenation unit is strongly dependent on the applied reactor configuration, especially at higher hydrogen releasing rate. What is needed is a solution that allows for efficient hydrogen production at low carbon intensity without requiring costly equipment such as air separation units or amine carbon absorption units. It would further be advantageous if such a solution could be readily coupled with an energy efficient and cost-effective storage and transportation method.

Advantageously, the instant application pertains to new systems and methods that allow for efficient hydrogen production without requiring costly equipment such as air separation units or amine carbon absorption units to avoid CO2 greenhouse gas emission in the system. The solutions described here may be coupled with an energy efficient, low carbon intensity and cost-effective storage and/or transportation method or system for hydrogen.

In one embodiment the application pertains to a reactor system comprising a fluidized bed combustor configured for reduced metal oxide oxidation and heat generation without the emission of greenhouse gas CO2. The reactor system also comprises a liquid organic hydrogen carrier dehydrogenation (LOHD) reactor. The fluidized bed combustor is operatively coupled to the liquid organic hydrogen carrier dehydrogenation reactor such that at least a portion of heat generated by the fluidized bed combustor may be transferred to the liquid organic hydrogen carrier dehydrogenation reactor.

In another embodiment the application pertains to a process comprising oxidizing a reduced metal oxide in the presence of air under suitable conditions to produce oxygen depleted air and an oxidized metal oxide. The oxidizing may be conducted in a fluidized bed combustor. The liquid organic hydrogen carrier is dehydrogenated in a dehydrogenation reactor under dehydrogenation conditions to form $H_2$ and at least a partially dehydrogenated liquid organic hydrogen carrier. The fluidized bed combustor is operatively coupled to the liquid organic hydrogen carrier dehydrogenation reactor such that at least a portion of any heat generated by the fluidized bed combustor may be transferred to the liquid organic hydrogen carrier dehydrogenation reactor.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
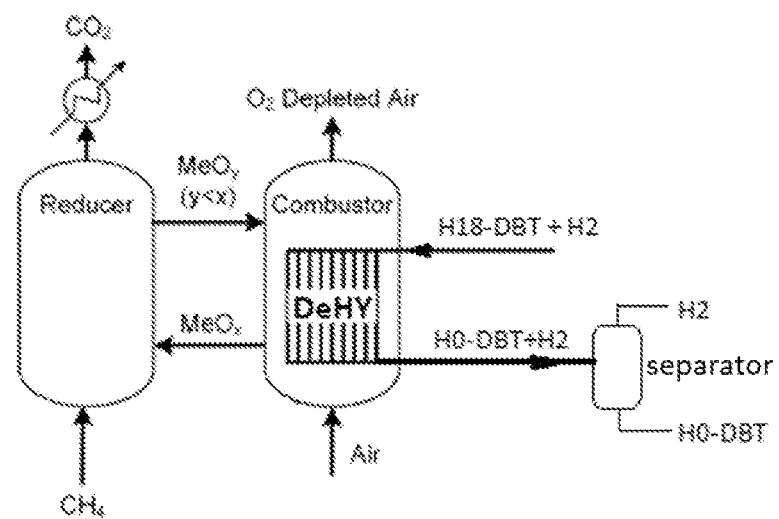
FIG. 1 shows a representative reactor system.

The following description of embodiments provides a non-limiting representative example referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The instant application pertains to a reactor system as well as, a method for generating, for example, $H_2$ and at least a partially dehydrogenated liquid organic hydrogen carrier. The reactor system described may be used for the methods described herein as well as other applicable methods. The reactor system generally comprises a fluidized bed combustor which may be configured in a manner that one of ordinary skill in the art would understand. In some embodiments the fluidized bed combustor is configured for reduced metal oxide oxidation.

The specific size, type, and design of the fluidized bed combustor may vary depending upon the desired input, catalyst, reaction conditions, product, and the like. Typically, the fluidized bed combustor is operatively coupled to a liquid organic hydrogen carrier dehydrogenation reactor. The specific size, type, and design of the liquid organic hydrogen carrier dehydrogenation reactor may also vary depending upon reactants, conditions, desired products, and the like. Typically, the fluidized bed combustor is operatively coupled to the liquid organic hydrogen carrier dehydrogenation reactor such that at least a portion of heat up to nearly all or all of the heat generated by the fluidized bed combustor may be transferred to the liquid organic hydrogen carrier dehydrogenation reactor. This advantageously contributes to high energy efficiency of the presently described systems and methods.

As described above, the fluidized bed combustor is operatively coupled to the liquid organic hydrogen carrier dehydrogenation reactor in a manner to transfer at least some up to nearly all or all the heat generated. Of course, the specific configuration of the coupled connection may vary depending upon the specifications of each reactor and other factors. In one embodiment, the operative connection is such that the liquid organic hydrogen carrier dehydrogenation reactor is submerged within the fluidized bed combustor.

The reactor system described above may have other apparatuses connected depending upon the desired use of the system. In some embodiments a reducer may be operatively coupled to the fluidized bed combustor. In this manner a metal oxide such as, but not limited to, $Fe_2O_3$, may be reduced to, for example FeO, and fed to the fluidized bed combustor. Within the combustor the reduced metal oxide such as FeO may be reacted with air to produce $O_2$ depleted air. While the combustor is oxidizing a metal oxide, the operatively connected liquid organic hydrogen carrier dehydrogenation reactor may be operating. The liquid organic hydrogen carrier dehydrogenation reactor may be operated under conditions to dehydrogenate a liquid organic hydrogen carrier to form $H_2$ and at least a partially dehydrogenated liquid organic hydrogen carrier.

The liquid organic hydrogen carrier is not particularly limited and may include, for example, a perhydrodibenzyl toluene, a perhydrobenzyl toluene, a methyl-cyclohexane, a cyclohexane, an N-ethyl carbazole, an ammonia borane, an ammonia, a formic acid, a siloxane, and any mixture thereof. In some embodiments the liquid organic hydrogen carrier may be perhydrodibenzyl toluene (H18-DBT) which may release up to nine $H_2$ for every mole of H18-DBT in a hydrogen carrier dehydrogenation reactor. Because this is an endothermic reaction requiring heat, it is advantageous to have the liquid organic hydrogen carrier dehydrogenation reactor coupled to the combustor so that at least a portion of heat from the combustor may be employed in the dehydrogenation reaction.

The reactor system may connect the liquid organic hydrogen carrier dehydrogenation reactor to a separator if hydrogen separation is desired. Such separators may vary depending upon the liquid organic hydrogen carrier employed as well as the dehydrogenation reactor design and conditions. After separation, if desired, the hydrogen may be transported via an operably connected transportation system to, for example, a hydrogen storage station or alternatively the hydrogen may be used as a fuel source on site.

In another embodiment the present application pertains to processes that may employ the aforementioned reactor system or some alternative. The processes generally comprise oxidizing a reduced metal oxide in the presence of air under suitable conditions to produce oxygen depleted air and an oxidized metal oxide. As described above, an exemplary embodiment may employ iron oxide reductant. Generally, the oxidizing may be conducted in a fluidized bed combustor. As with the reactor system the liquid organic hydrogen carrier may include perhydrodibenzyl toluene which can be dehydrogenated in any convenient reactor such as the liquid organic hydrogen carrier dehydrogenation reactor under dehydrogenation conditions sufficient to form a $H_2$ and dibenzyl toluene.

The $H_2$ and the at least partially dehydrogenated liquid organic hydrogen carrier such as dibenzyl toluene may be separated in any convenient manner. The $H_2$ may then be used, transported, and/or stored as desired.

FIG. 1 shows a multiple tube LOHC reactor submerged in a fluidized bed combustor. In this manner at least a portion up to nearly all or all of the heat generated from the oxidation may be transferred through one or more tube walls (or in some other convenient manner depending upon the configuration) to provide energy for the dehydrogenation reaction. With this configuration, a carbonaceous fuel such as natural gas is fed into the reducer to reduce a metal oxide and generate a pure or nearly pure stream of CO2 after H2O is condensed and separated out. This CO2 stream is ready for sequestration or other utilization, without the need of further gas phase separation. Me is a metal or metal mixture that can be reduced by the carbonaceous fuel and subsequently oxidized by air. Such metal includes Fe, Co, In, Mn, Sn, Zn, Cu, W, and combinations thereof.

Figure 2:
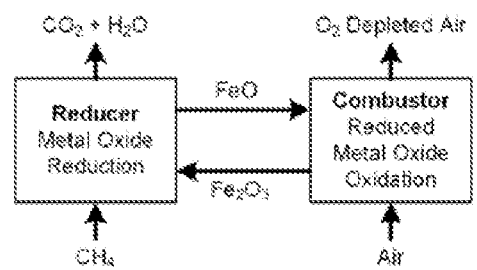
FIG. 2 shows oxidation of fuel in a reducer and heat generation in a combustor.

FIG. 2 shows representative reducer and combustor reactions. While FIG. 2 is shown with respect to iron oxide it should be appreciated that many other metal oxides may be useful.

The reducer reactor is typically operated at 400-1200° C. The combustor reactor is usually operated at a temperature 0-400° C. higher than the reducer depending on the type of metal or metals used in the system. The reduction reaction in the reducer is typically endothermic. A portion of the reduced metal oxide from the reducer is directly sent to the combustor for oxidation with oxygen in the feeding air. The heat released from the exothermic reaction in the combustor is used to compensate for the heat required for the dehydrogenation reaction of LOHC.

Metal and metal oxide in the system are typically in the form of porous spherical particles in the range of 0.1 to 10 mm. The fluidized bed combustor is operated in a bubbly and/or turbulent regime to provide high heat transfer efficient through the embedded tube buddle which contains the dehydrogenation catalyst.

Example 1: Dehydrogenation of Perhydrodibenzyltoluene (H18-DBT)

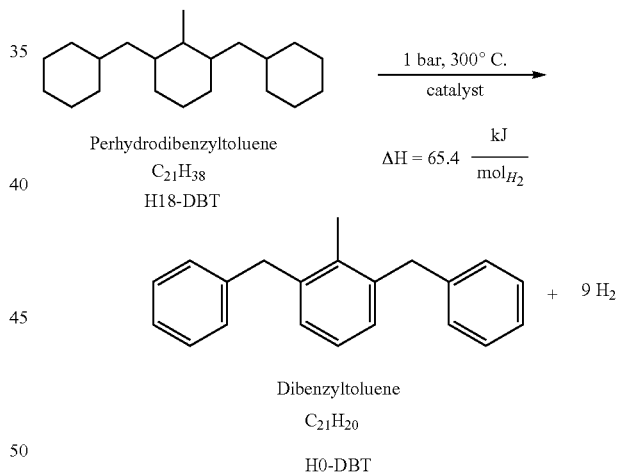

Dibenzyltoluene is a commercial available fluid that may be sold by Sasol as an isometric mixture of dibenzyltoluenes under the trade name Marlotherm SH. H0-DBT has been reported to exhibit excellent thermal properties and a high hydrogen storage capacity of 6.2 wt %.

As a Liquid Organic Hydrogen Carrier, H0-DBT is charged with hydrogen and converted to H18-DBT at a hydrogen production site, and then transported to the destination where hydrogen is required. The H0-DBT/H18-DBT LOHC system has diesel-like properties and can be handled with existing industrial infrastructure for fuels. From H18-DBT, hydrogen can be released on demand by catalytic dehydrogenation with an appropriate catalyst at temperatures 200-400° C. This dehydrogenation reaction is highly endothermic, with reaction enthalpy of 65.4 KJ/mol- H2. The process configuration in FIG. 1 provided an efficient way of heat supply for the reaction with high heat transfer coefficient.

Example 2: Dehydrogenation of Cyclohexane

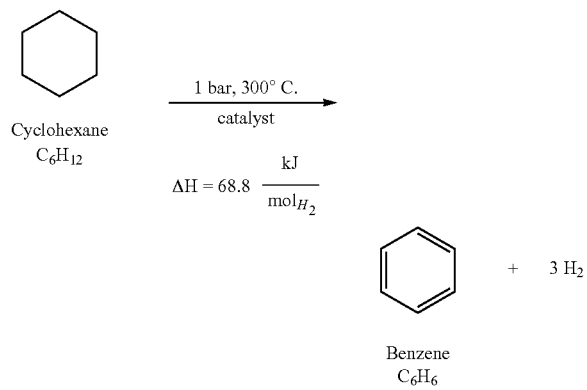

The LOHC compound cyclohexane has a hydrogen storage capacity of 7.19 wt % and is a liquid at room temperature.

As a Liquid Organic Hydrogen Carrier, benzene is charged with hydrogen and converted to cyclohexane at a hydrogen production site, and then transported to the destination where hydrogen is required. From cyclohexane, hydrogen can be released on demand by catalytic dehydrogenation with an appropriate catalyst at temperatures 200-400° C. This dehydrogenation reaction is highly endothermic, with reaction enthalpy of 68.8 KJ/mol-H2. The process configuration in FIG. 1 provides an efficient way of heat supply for the reaction with high heat transfer coefficient.

Example 3: Dehydrogenation of Toluene

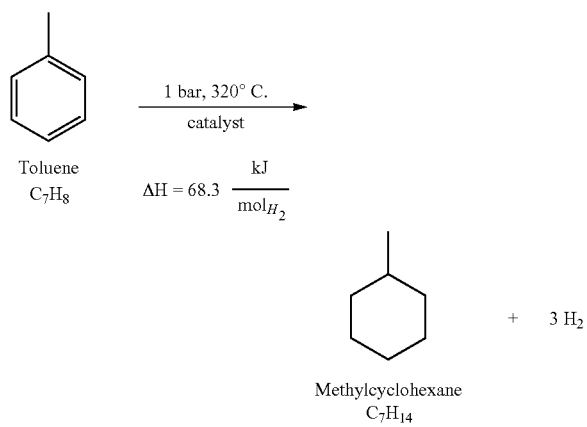

Methylcyclohexane has a hydrogen storage capacity of 6.2 wt % and is a liquid state at ambient conditions.

As a Liquid Organic Hydrogen Carrier, toluene is charged with hydrogen and converted to methylcyclohexane at a hydrogen production site, and then transported to the destination where hydrogen is required. From methylcyclohexane, hydrogen can be released on demand by catalytic dehydrogenation with an appropriate catalyst at temperatures 100-400° C. This dehydrogenation reaction is highly endothermic, with reaction enthalpy of 68.3 kJ/mol-H2. The process configuration in FIG. 1 provides an efficient way of heat supply for the reaction with high heat transfer coefficient.

For most of the pure hydrocarbon LOHC system, the lower the operating pressure, the lower the operating temperature that allows full conversion of the dehydrogenation reaction. Thus, from a thermodynamic point of view, the lowest possible system pressure is to be chosen for dehydrogenation. However, this is not always beneficial for the catalyst and can favor side reaction and catalyst deactivation.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A reactor system comprising: a fluidized bed combustor configured for reduced metal oxide oxidation; and a liquid organic hydrogen carrier dehydrogenation reactor; wherein the fluidized bed combustor is operatively coupled to the liquid organic hydrogen carrier dehydrogenation reactor such that at least a portion of heat generated by the fluidized bed combustor may be transferred to the liquid organic hydrogen carrier dehydrogenation reactor; wherein the liquid organic hydrogen carrier dehydrogenation reactor is a closed system with respect to the fluidized bed combustor; and wherein the liquid organic hydrogen carrier dehydrogenation reactor is submerged within and surrounded by the fluidized bed combustor.

2. The reactor system of claim 1 further comprising a reducer operatively coupled to the fluidized bed combustor such that a metal oxide may be reduced and fed to the fluidized bed combustor.

3. The reactor system of claim 1 wherein there is substantially no greenhouse gas emission to the environment from the fluidized bed combustor.

4. The reactor system of claim 1 wherein the liquid organic hydrogen carrier dehydrogenation reactor is configured to be connected to a separator.

5. The reactor system of claim 4 further comprising a transportation system operably connected to the separator.

6. A process comprising:
oxidizing a reduced metal oxide in the presence of air under suitable conditions to produce oxygen depleted air and an oxidized metal oxide wherein the oxidizing is conducted in a fluidized bed combustor; and
dehydrogenating a liquid organic hydrogen carrier in a liquid organic hydrogen carrier dehydrogenation reactor under dehydrogenation conditions to form $H_2$ and an at least partially dehydrogenated liquid organic hydrogen carrier;
wherein the fluidized bed combustor is thermally coupled to the liquid organic hydrogen carrier dehydrogenation reactor such that at least a portion of heat generated by the fluidized bed combustor may be transferred to the liquid organic hydrogen carrier dehydrogenation reactor; and
wherein the liquid organic hydrogen carrier dehydrogenation reactor is a closed system with respect to the fluidized bed combustor; and wherein the liquid organic hydrogen carrier dehydrogenation reactor is submerged within and surrounded by the fluidized bed combustor.

7. The process of claim 6 which further comprises reducing a metal oxide comprising $Fe_2O_3$ to FeO to form the reduced metal oxide.

8. The process of claim 6 wherein the liquid organic hydrogen carrier is selected from a perhydrodibenzyl toluene, a perhydrobenzyl toluene, a methyl-cyclohexane, a cyclohexane, an N-ethyl carbazole, an ammonia borane, a siloxane, and any mixture thereof.

9. The process of claim 6 wherein the liquid organic hydrogen carrier is perhydrodibenzyl toluene.

10. The process of claim 9 wherein the perhydrodibenzyl toluene is dehydrogenated in the liquid organic hydrogen carrier dehydrogenation reactor under conditions sufficient to form a $H_2$ and dibenzyl toluene.

11. The process of claim 9 further comprising separating $H_2$ and the perhydrodibenzyl toluene.

12. The process of claim 6 further comprising separating $H_2$ and the at least partially dehydrogenated liquid organic hydrogen carrier.

13. The process of claim 12 further comprising transporting the $H_2$.

14. The process of claim 11 further comprising transporting the $H_2$.

* * * * *